United States Patent [19]

De Busscher et al.

[11] Patent Number: 4,628,946

[45] Date of Patent: Dec. 16, 1986

[54] HARVESTING MACHINE INCLUDING CHOPPER MEANS

[75] Inventors: Cyriel R. J. De Busscher, Damme; François Van Herpe, Houtem, both of Belgium

[73] Assignee: New Holland Inc., New Holland, Pa.

[21] Appl. No.: 269,103

[22] Filed: Jun. 1, 1981

[30] Foreign Application Priority Data

Jun. 11, 1980 [GB] United Kingdom ............... 8019118

[51] Int. Cl.[4] ............................................. A01F 29/00
[52] U.S. Cl. .................................. 130/27 R; 56/14.6; 241/186.3
[58] Field of Search ............... 130/22 A, 27 H, 27 R, 130/27 J; 56/504, 14.6; 241/186.1, 186.3, 186.4

[56] References Cited

U.S. PATENT DOCUMENTS

| | | | |
|---|---|---|---|
| 1,172,114 | 2/1916 | Debaker . | |
| 3,149,449 | 9/1964 | Mulder . | |
| 3,712,309 | 1/1973 | Schmitz . | |
| 4,056,107 | 11/1977 | Todd | 130/27 R |
| 4,149,543 | 4/1979 | Decoene | 130/27 P |
| 4,292,795 | 10/1981 | Linn | 130/27 R |

FOREIGN PATENT DOCUMENTS

| | | |
|---|---|---|
| 2047023 | 3/1972 | Fed. Rep. of Germany . |
| 2444550 | 4/1976 | Fed. Rep. of Germany . |
| 1534800 | 12/1978 | Fed. Rep. of Germany . |
| 2810176 | 4/1979 | Fed. Rep. of Germany . |

Primary Examiner—Gene Mancene
Assistant Examiner—John G. Weiss
Attorney, Agent, or Firm—Larry W. Miller; Frank A. Seemar; Darrell F. Marquette

[57] ABSTRACT

A harvesting machine comprising a threshing mechanism, a transverse rotary separator mechanism having discharge outlets adjacent its opposite ends, and discharge channels in register with the discharge outlets leading to a common strawhood. The separator mechanism is arranged spirally to convey crop material received from the threshing mechanism toward each of its ends while submitting the crop material to a separating action and to forcefully eject crop material through said discharge outlets and through said discharge channels in the direction of the common strawhood. A crop material chopper device is associated with each discharge channel and is disposed out of the normal path of the crop materials through the respective discharge channel. A deflector device associated with each chopper device is adjustable between a position retracted from said normal path of the crop material and a further position across said normal path. The arrangement is such that in the former position of the deflector device, crop material forcefully issuing from the separating mechanism bypasses the associated chopper device in moving toward the strawhood and that in the latter position said crop material is deflected from said normal path toward the associated chopper device.

21 Claims, 3 Drawing Figures

HARVESTING MACHINE INCLUDING CHOPPER MEANS

BACKGROUND OF THE INVENTION

The present invention relates to threshing and more particularly to threshing machines having cylinders.

While the terms "grain" and "straw" are used principally throughout this specification for convenience, it should be understood that the terms are not intended to be limiting. Thus "grain" refers to that part of the crop material which is threshed and separated from the discardable part of the crop material which is referred to as "straw".

With combines at present in use, the operator often wants to have the option to either use or not use a straw chopper. Such a straw chopper often is mounted on the combine strawhood in an "out-of-use" position and is movable manually, when desired, to an "in-use" position. Due to the bulky nature of such a straw chopper, such an operation is often difficult, tiring and time consuming.

In an attempt to overcome this problem, it has already been proposed to attach a straw chopper in a fixed position to the outlet of a combine strawhood, and to install a deflector plate between the straw walkers of the combine and the straw chopper which is adjustable in two positions. In one position of the deflector plate, straw, which drops from the straw walkers, is guided into the chopper, while that in the other position, said straw is guided past the straw chopper and dropped directly onto the ground. However, in such an arrangement, the free opening for the straw to pass through, in case it is not chopped, has been reduced substantially. As a result thereof risks for plugging have increased accordingly. Moreover, as straw is moved across such a deflector plate only by gravity, this is another reason for increased risks for plugging even when the components are adjusted for chopping the straw.

It has been attempted to overcome such plugging risks by installing feed rolls between the straw walkers and the straw chopper and which forcefully feed straw into the straw chopper. However, these feed rolls have no effect on the plugging risks in case the machine is adjusted in the "non-chopping" condition. Moreover, the provision of additional components, such as feed rolls and the drives, therefore, only can increase the total cost price of the machine.

Recent developments in combines have led to the so called "rotary" combines, wherein the oscillatory straw walkers have been replaced by rotary separator components. Also on these machines, a straw chopper may be provided which the operator may not wish to use at all times, but which must be readily available for use when required. If the straw chopper is attached, as on conventional combines, at the rear end of the straw hood, substantially the same problems are present in this combination as in the combination of a conventional combine equipped with a straw chopper.

Furthermore, it is normally necessary that, when the straw chopper is in the "out-of-use" condition, the straw issuing from the machine is discharged onto the ground in a windrow suitable for an eventual subsequent baling operation. On the other hand, when the straw is chopped, such chopped straw should be evenly spread across a wide band whereby subsequent tillage problems will be avoided. This objective has not always been met with the known arrangements.

The foregoing illustrates limitations of the known prior art. Thus, it is apparent that it would be advantageous to provide an alternative directed to overcoming one or more of the limitations as set forth above.

SUMMARY OF THE INVENTION

In one aspect of the present invention, this is accomplished by providing a harvesting machine comprising a threshing mechanism and a transverse rotary separator mechanism operably connected with the threshing mechanism. Discharge channels lead from the separator mechanism to a common strawhood. A crop material chopper is associated with each discharge channel and positioned out of the normal path of crop material through the respective discharge channel. A deflector is associated with each chopper and is adjustable between a first position and a second position. The first position retracts the deflector from the normal path of crop material and the second position blocks the normal path. As a result, crop material by-passes the chopper and moves toward the straw hood in response to the deflector being in the first position, and the crop material is deflected toward the chopper in response to the deflector being in the second position.

The foregoing and other aspects will become apparent from the following detailed description of the invention when considered in conjunction with the accompanying drawings. It is to be expressly understood, however, that the drawings are not intended as a definition of the invention but are for the purpose of illustration only.

DESCRIPTION OF THE PREFERRED EMBODIMENT

Figure 1:
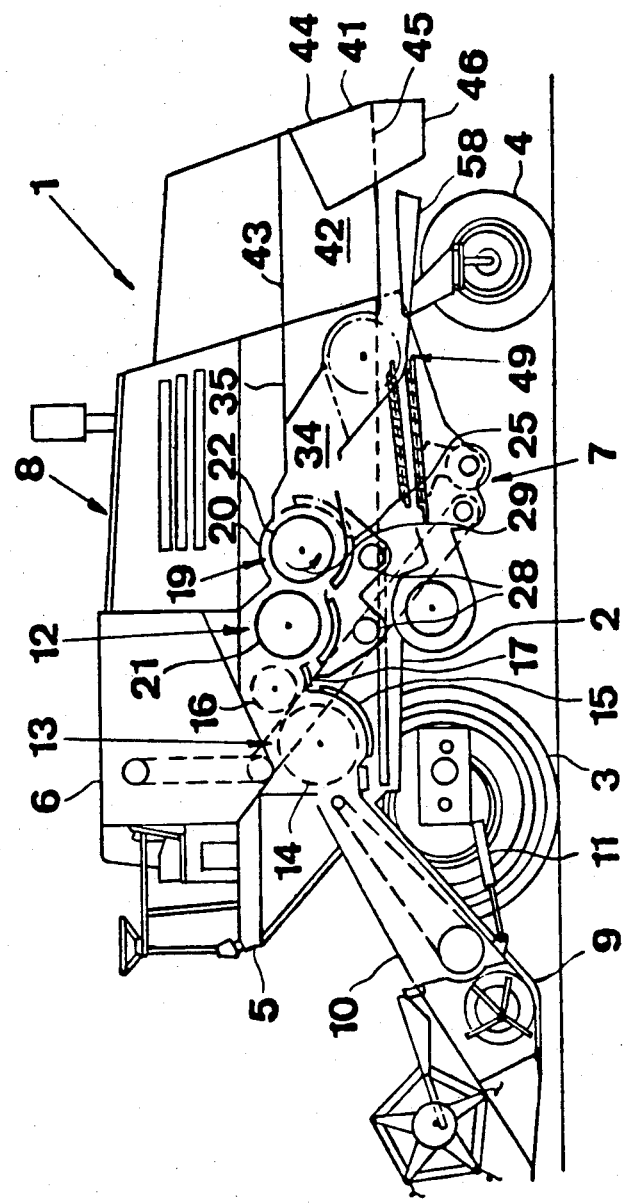
FIG. 1 is a side view illustrating an embodiment of the combine harvester of this invention.
Figure 2:
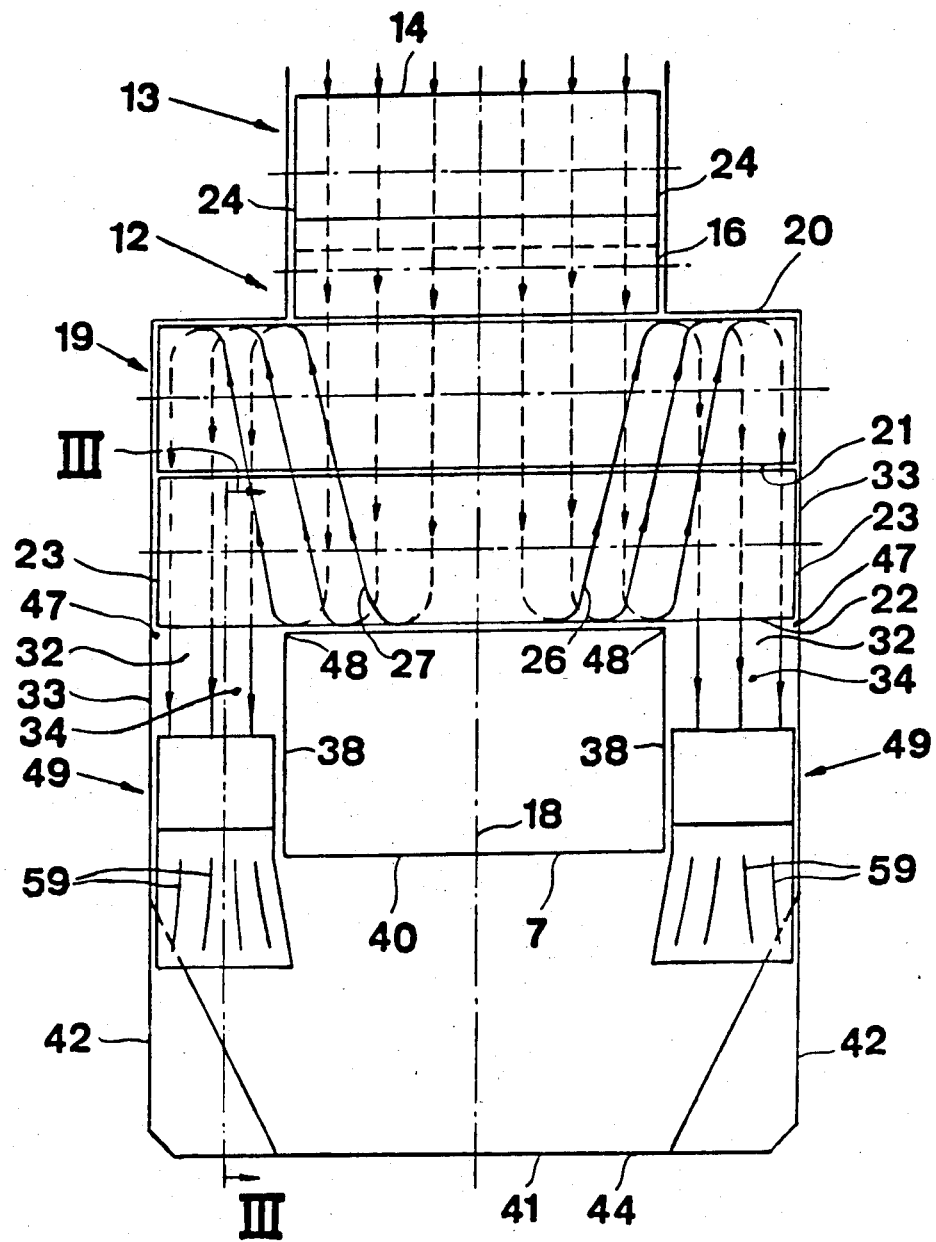
FIG. 2 is a top view illustrating an embodiment of the threshing, separating and chopping mechanisms of the combine harvester of FIG. 1.

With reference to FIG. 1, the combine is generally indicated at 1 and comprises a main frame or chassis 2 supported on a pair of front drive wheels 3 and a pair of rear steerable wheels 4. Supported on the main frame 2 are an operator's platform 5, a grain tank 6, a grain cleaning mechanism 7 and an engine 8. A conventional header 9 and feed conveyor 10 extend forwardly of the machine and are pivotally secured to the frame 2 for general vertical movement which is controlled by hydraulic cylinders 11. The main frame also supports a threshing and separating mechanism generally indicated at 12 and which is of the rotary type.

The threshing portion 13 of the mechanism 12 comprises a conventional rotatable thresher cylinder 14 cooperable with a conventional stationary thresher concave 15, the operation of which is generally known in the art.

Rearwardly of the thresher cylinder 14 and the thresher concave 15, there is provided a conventional deflector or so-called straw beater 16 with a cooperable grate 17. The straw beater 16 and grate 17 are of substantially the same width as the threshing mechanism 13 and are arranged behind the latter in a manner to receive the crop issuing therefrom. The threshing mechanism 13, the straw beater 16 and the grate 17 equally have substantially the same width as the cleaning mechanism 7 and are disposed generally above a forward portion thereof in a manner so that material separated in the thresher concave 15 and the grate 17 drops by gravity on said forward portion of the cleaning mechanism 7.

Rearwardly of the straw beater 16, and at a location generally above the cleaning mechanism 7, a rotary separating mechanism 19 is provided which comprises a single transverse casing or housing 20 wherein two transversely extending separator rotors 21 and 22 are mounted the one behind the other. In an alternative arrangement, the pair of rotors 21,22 may be replaced by a single rotor. The plane of symmetry 18 of the separating mechanism 19 generally coincides with the plane of symmetry of the threshing mechanism 13 and of the cleaning mechanism 7. The width of the separating mechanism 19 substantially exceeds the width of the threshing mechanism 13 and of the cleaning mechanism 7 so that the outer ends 23 of the separating mechanism 19 extend past the respective ends 24 of the threshing mechanism 13 and the sides of the cleaning mechanism 7.

The separator casing 20 is in part defined by separator concaves 25 and comprises a central forwardly facing inlet to receive crop material from the straw beater 16. The rotors 21,22 are driven in the same direction 29 and comprise crop treating and crop conveying elements cooperable with the separator concaves 25 and operable in use to separate grain from the straw while conveying approximately half the mat of straw in a spiral path 26 around both of the rotors at the inner side of the casing 20 and to one end of the separating mechanism 19 for discharge, and the remainder of the straw in an opposite spiral path 27 around both rotors to the opposite end for discharge.

Grain separated through the separator concaves 25 which are disposed above the cleaning mechanism drops onto said cleaning mechanism by gravity. Grain separated through the separator concaves 25 which are disposed at the outer ends of the separator housing 20 is conveyed inwardly and toward the cleaning mechanism by transverse augers 28 disposed below said concave sections.

At its outer ends, disposed outside the outer ends of the threshing mechanism 13 and outside the sides of the cleaning mechanism 7, the rear rotor 22 carries a number of discharge vanes 30. Said discharge vanes extend generally axially and generally radially outwardly from the rotor body. The casing 20 comprises rearwardly facing, generally rectangular discharge outlets 32 adjacent its opposite ends and which have a width generally corresponding to the axial extent of the vanes 30 of the rotor 22. Said discharge outlets 32 thus are disposed at a level above the level of the cleaning mechanism 7 and completely to the left, respectively the right of said cleaning mechanism. The outer sides 47 of the discharge outlets 32 generally coincide with the outer ends 23 of the rotor housing 20 and with the side shieldings 33 of the combine. The inner sides 38 of the discharge outlets 32 generally coincide with the side panels 38 of the combine chassis 2 which extend alongside the cleaning mechanism 7 and alongside the threshing mechanism 13. Said discharge outlets 32 further are located substantially forwardly of the discharge end 40 of the cleaning mechanism 7.

Rearwardly of the discharge outlets 32, generally fore-and-aft extending spaced apart straw discharge channels 34 are defined between the combine outer side shieldings 33 and the chassis side panels 38. These channels extend from said discharge outlets 32 to locations generally at the discharge end 40 of the cleaning mechanism 7. The top walls 35 of the discharge channels may be defined by generally horizontal roof portions.

Rearwardly of the straw discharge channels 34 a single straw hood 41 is provided which is defined by generally fore-and-aft extending side walls 42, a top wall 43 and a transversely extending, generally upright rear wall 44. The sttaw hood 41 has a downwardly facing discharge opening 45 which is located rearwardly of the cleaning means 7. The straw hood 41 and the discharge opening 45 thereof have a plane of symmetry 18 which is generally coincident with the plane of symmetry of the separating mechanism 19 and the cleaning means. At its forward end, the straw hood 41 is attached to the combine structure in a manner so that the straw hood side walls 42 are aligned with the side shieldings 33 which in part define the straw discharge channels 34 whereby said straw discharge channels 34 communicate with the straw hood inner side.

Inside the straw hood 41 and generally in the paths of the straw issuing from the straw discharge channels 34, deflector means are provided which are indicated schematically at 46, and which, in use, are capable of deflecting the spaced apart straw mats issuing from said discharge channels 34 toward each other in a manner so that said straw drops from the straw hood 41 onto the ground into a single windrow generally at the fore-and-aft center of the machine.

Attached to the side shieldings 33 and to the side panels 38 of the chassis at the lower side of each discharge channel 34 is a straw chopper which is generally indicated at 49. Thus, a pair of transversely spaced apart straw choppers 49 is provided. Said straw choppers are disposed generally below the paths of the straw as it is forcefully ejected in a rearward direction from the separator discharge outlets 32, and between said discharge outlets 32 on the one hand and the straw hood 41 on the other hand.

Each straw chopper 49 typically includes a housing 51, which is open at its forward upper end at 61 and communicates with the discharge channel 34. The housing is defined in part by the side shieldings 33 and the side panels 38 and by an arcuate wall 52 extending between said side shieldings and said side panels and enclosing both the bottom and the top of the chopper housing. The arcuate wall 52 comprises a top and bottom section 53, respectively 54, defining between them an outlet 55. The bottom wall section 54 includes an upwardly and forwardly extending tangential infeed plate 56 which terminates at a location below the trajectory of straw forcefully issued from the separator discharge outlets 32.

Pivotally attached to the upper and forward edge of the upper wall section 53 is a deflector plate 57, which may be positioned at wish in any of two positions. In a first position, said deflector plate 57 extends upwardly and forwardly across the path of straw issuing from the discharge opening 32 and has its free forward edge resting against the top wall 35 of the discharge channel 34. In the other position, said deflector plate 57 is lowered and is closing off the straw chopper inlet 61.

An angularly adjustable deflector board 58 is attached to the rear edge of the bottom wall section 54 of the chopper housing and extends generally in a rearward direction below the lower edge of the straw hood 41 for deflecting the crop material in a rearward direction as it leaves the chopper. A number of angularly adjustable fins 59 are conventionally provided on the upper side of the deflector board 58 to direct chopped straw outwardly as it moves along said deflector board, so that chopped straw is dispersed in a relatively wide band.

A relatively large number of stationary knives 62 are provided in a transverse row, the one next to the other, generally at the lower edge of the infeed plate 56.

Inside each chopper housing 52 an axially transverse chopper rotor 63 is provided, which typically includes a generally cylindrical core 64 mounted on an axially transverse shaft 67 having its opposite ends journalled in the opposite sidewalls defining in part the chopper housing. A relatively large number of flails or knives 65 are swingably mounted on the rotor core 64, the arcuate portions of the chopper casing 52 being concentric with and proximate to the periphery of the rotor when the knives are extended as a result of centrifugal forces during operation. In use the swingably mounted knives 65 are arranged in cooperative interfitting chopping relation with the fixed knives 62.

Figure 3:
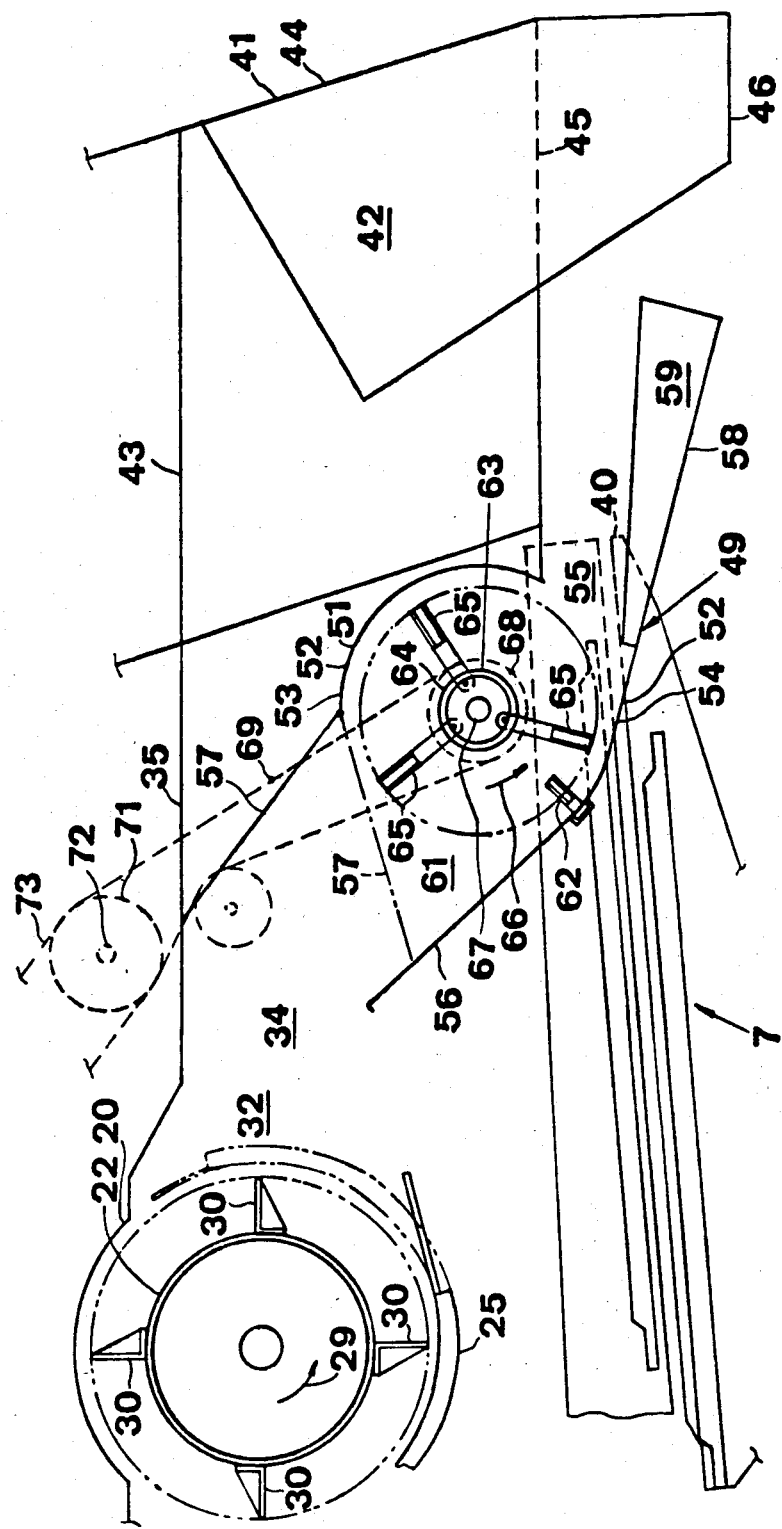
FIG. 3 is an enlarged sectional view taken along the lines III—III of FIG. 2.

The chopper rotors 63 are driven by drive pulleys 68 mounted on the shafts 67 at the opposite sides of the machines and which in turn are driven by belts 69 which are connected to and driven by pulleys 71 on an intermediate shaft 72 located above the top walls 35 of the discharge channels 34. The intermediate shaft 72 receives motive power from the combine engine through a belt drive 73 and a clutch mechanism in a usual manner. The clutch mechanism which is quite conventional has, therefore, not been shown in any details in the drawings. The chopper rotors 63 are driven in the anti-clockwise direction 66 when viewed from the left of the machine and as shown in FIG. 3, so that the straw or the like is impelled tangentially rearwardly after engagement with the rotor knives 65.

In operation of the combine, the machine is propelled forwardly over the field and the crop material to be harvested is severed from the stubble by a sickle bar cutter on the header 9 and is conveyed by the header and the feed conveyor 10 in a generally flat mat extending over the full width of the feed conveyor to the threshing and separating mechanism 12. The crop material received within the threshing and separating mechanism 12 is threshed, that is to say, the crop material is rubbed and beaten whereby the grain is loosened from the straw. The thresher cylinder 14 is rotated at a relatively high speed and propels the crop in a rearward direction across the thresher concave 15 while separating already a major percentage of the threshed grain from the straw through said concave 15. The straw mat is passed from the thresher cylinder 14 and thresher concave 15 in an upward and rearward direction towards the straw beater 16 which is operative to deflect the same in a rearward direction across the grate 17 and toward the inlet of the separating mechanism 19. The width of the straw mat remains generally unchanged while passing from the feed conveyor 10 to the separating mechanism 19.

The crop treating and crop conveying elements on the rotors 21,22 and the cooperable separator concaves 25 are operable in use to separate further grain from the straw while conveying approximately half the mat of straw in a spiral path 26 to one end and the remainder of the straw mat in an opposite spiral path 27 to the opposite end of the separator mechanism 19.

Material which has been separated from the straw either falls directly onto the cleaning mechanism 7 or is conveyed thereto by the conveyor augers 28. The cleaning mechanism 7 includes means to separate chaff from the grain and means to separate unthreshed material (known in the art as tailings) from the grain. Clean grain is then elevated to the grain tank 6 for temporary storage therein and the tailings are returned to the threshing and separating mechanism 12.

Finally the two straw mat halves are forcefully projected by the discharge vanes 30 on the rotor 22 in generally rearward directions through the separator discharge oulets 32. In case the straw material issuing from the machine needs not to be chopped, the deflector plates 57 are positioned in their lowermost position in which they are closing off the chopper inlets 61 and thus are retracted from the paths of straw issuing from the separator means. Also the drive of the straw chopper rotors 63 may be interrupted (by the conventional clutch means mentioned above, but not shown in the drawings). In this retracted position of the deflector plates 57, the vanes 30 forcefully project the straw material through the respective straw discharge channels 34 over and beyond the straw choppers 49 into the strawhood 41 where the deflector means 46 are disposed to deflect the two straw mat halves toward each other so as to form a single windrow centrally of the machine, ready for any eventual subsequent straw baling. Thus, in other words, the two portions of the straw mat which are discharged from the separator mechanism 19 at transversely spaced apart locations are deposited onto the ground in a single windrow which is generally centered on the plane of symmetry 18 of the separator mechanism 19 and the cleaning mechanism 7 due to the action of the deflector means 46.

In case the straw issuing from the separator mechanism 19 has to be chopped, all what is required, is engaging the drive of the straw choppers 49 on the one hand and swinging the deflector plates 57 into their respective raised positions in the discharge channels 34 on the other hand. In these positions of the deflector plates 57, straw, forcefully ejected from the separator mechanism 19 by the discharge vanes 30, is projected thereagainst and deflected thereby toward the respective chopper means 49. The infeed plates 56 help leading the straw toward the chopper inlets. The rotor knives 65 of the chopper rotors 63 intercept the flow of material deflected by the deflector plates 57 and subject it to a vigorous chopping action in the course of which the knives 65 force the material against and between the stationary knives 62 and discharge it at a high velocity to the chopper outlet 55. As the chopper material leaves the choppers 49 through the outlets 55, said material moves along the upper side of the deflector board 58 and between the adjacent fins 59 so that the chopped straw is dispersed in relatively wide bands. It will thus be clear that in these latter positions of the deflector plates 57, the deflector means 46 in the strawhood 41 have no effect on the movement of the chopped material and that thus the material is not deflected in any way to the center of the machine. Instead thereof and as is desirable, chopped material is widely spread across the field, so that in a subsequent tillage operation no plugging problems, etc. will be met. This wide spread is in part due to the fact that two spaced apart chopper units are provided which each chop and spread half the amount of straw processed by the combine. Yet, if no chopping is required only a single centrally disposed windrow is formed.

From what precedes, it will be clear that the machine very easily and quickly can be adjusted from a non-chopping condition into a chopping condition and vice verse without having to shift or pivot the heavy chopper unit as is conventional on known combines.

Also, as in the chopping condition, straw is forcefully projected into the chopper units, rather than being fed thereto by gravity, as is the case in conventional combines, the chopping performance of the chopper units according to the invention is superior with a substantially decreased risk for plugging.

If, as is known from conventional machines, a single, known straw chopper were attached to the strawhood 41 at the rear end of the discharge opening 45 thereof, said single straw chopper would have to be wider than the sum of the widths of the two individual straw choppers according to the invention. Thus, a smaller number of stationary and rotary knives may be provided. Also, with the installation of the straw chopper units in the discharge channels 34 rather than at the much further rearward outlet of the strawhood, better use is made of the fact that material is forcefully ejected from the separating mechanism, whereby the risk for plugging is reduced. Also, because of this forward location of the straw chopper units, increasing the overall length of the machine has been avoided. Furthermore, the straw choppers according to the invention are really integrated in the combine design and thus no longer form an attachment which is mounted to the rear end of the machine. Such attachments often deteriorate the styling of a machine.

It will be understood that the invention is not limited to the structure which has been illustrated and described and that there may be various departures therefrom within the scope of the claims which follow. In the structure described above, the separator mechanism has two opposed outlets, and is arranged spirally to convey crop material to one outlet and a substantially equal amount of crop material to the other outlet. It is clear that in an alternative arrangement, the separator mechanism may have only one outlet offset relative to the fore-and-aft line of symmetry. In this arrangement all crop material received in the separator mechanism is spirally conveyed to this one outlet. In this alternative embodiment of the invention only one discharge channel is provided in register with the separator outlet. Said discharge channel still communicates with a strawhood and a single chopper means is disposed in association with the discharge channel at a location below the normal path of the crop material as it is forcefully ejected through the separator outlet and projected through the discharge channel in the direction of the straw hood. A deflector means in the form of a plate is angularly adjustable between a position fully retracted from said normal path of the crop material and a position across said normal path. In said latter position, crop material issuing from the separator mechanism is deflected to the chopper means for being chopped thereby. In the former position, crop material bypasses said chopper means. Further deflector means may be mounted to the strawhood for, in case the chopper means and associated components are adjusted in the non-chopping position, deflecting the crop material towards the fore-and-aft centerline of the machine.

Having thus described the invention, what is claimed is:

1. A harvesting machine comprising:
   a threshing mechanism;
   a transverse rotary separator mechanism operably connected with the threshing mechanism and having discharge outlets adjacent its opposite ends;
   discharge channels in register with the discharge outlets of the separator mechanism and leading to a common straw hood;
   the separator mechanism being arranged spirally to convey crop material received from the threshing mechanism toward each of its ends while submitting the crop material to a separating action and to forcefully eject crop material along a normal discharge path through said discharge outlets and through said discharge channels in the direction of the common straw hood;
   chopper means associated with each discharge channel and positioned out of the normal path of the crop material through the respective discharge channel for chopping crop material ejected from said separator mechanism; and
   first deflector means associated with each chopper means for selectively engaging the crop material moving along said normal discharge path and deflecting said crop material into the respective said chopper means, said first deflector means being selectively adjustable between a first position retracted from said normal path of the crop material such that said crop material continues to move along said normal discharge path toward said straw hood and a second position blocking said normal path for deflecting crop material from said normal path toward the associated chopper means.

2. A harvesting machine according to claim 1 further comprising:
   second deflector means associated with the straw hood and disposed rearwardly of the chopper means for deflecting crop material forcefully issued from the discharge outlets along said normal discharge path into a predetermined pattern.

3. A harvesting machine according to claim 2 wherein the second deflector means are operable to deflect the crop material such that a single windrow is formed on the ground.

4. A harvesting machine according to claim 3 wherein the separator mechanism comprises a rotor at each discharge outlet having a plurality of discharge vanes which are operable to forcefully eject crop material through each discharg outlet into each associated discharge channel.

5. A harvesting machine according to claim 2 wherein each discharge outlet is facing to the rear of the machine and wherein each discharge channel is oriented generally longitudinally of the machine.

6. A harvesting machine according to claim 5 further comprising:
   a cleaning mechanism disposed generally below the separator mechanism, the width of the separator mechanism exceeding the width of the cleaning mechanism, and wherein each discharge channel is confined between a chassis side panel extending alongside one side of the cleaning mechanism and a side wall of the harvesting machine generally aligned with an end of the separator mechanism, each said chopper means being disposed generally forwardly of the discharge end of the cleaning mechanism.

7. A harvesting machine according to claim 6 wherein each chopper means comprises a transverse chopper rotor including a plurality of swingably mounted rotor cores and extending concentrically in a generally cylindrical chopper housing, the housing including an inlet communicating with the associated discharge channel and a generally rearwardly facing outlet.

8. A harvesting machine according to claim 7 wherein each chopper means includes an infeed plate associated with the inlet of the chopper housing and which extends generally tangentially therewith in an upward and forward direction terminating at a location below the normal path of the crop material forcefully issuing from the separator mechanism.

9. A harvesting machine according to claim 7 wherein the first deflector means includes a deflector plate which is hinged at one edge to the chopper housing and which may be positioned to extend from the chopper housing across the associated discharge channel in a generally upward and forward direction.

10. A harvesting machine according to claim 9 wherein the first deflector means in the first position closes off the chopper inlet.

11. A harvesting machine according to claim 7 wherein each chopper means comprises a deflector board extending from the chopper outlet in a generally rearward direction below the lower side of the straw hood.

12. A harvesting machine according to claim 11 wherein the deflector board is angularly adjustable.

13. A harvesting machine according to claim 11 wherein a plurality of angularly disposed deflector fins are provided on the deflector board.

14. A harvesting machine according to claim 11 wherein the deflector board terminates forwardly of the rear end of the straw hood.

15. A harvesting machine comprising:
a threshing mechanism for threshing crop material;
a separator mechanism operably connected with said threshing mechanism to separate grain crop from the trash material, said separator mechanism being operable to traject said trash material through a discharge outlet along a normal discharge path;
a straw hood having an upper portion positioned within said normal discharge path to deflect said trash material moving along said normal discharge path toward the ground;
a straw chopper disposed below said normal discharge path between said discharge outlet and said upper portion of said straw hood, said straw chopper being operable to chop trash material directed thereto; and
a first deflector means for intersecting said normal discharge path and deflecting said trash material into said straw chopper, said first deflector means being selectively movable between a first retracted position wherein said trash material is free to move along said normal discharge path and a second intersecting position wherein said first deflector means engages said trash material within said normal discharge path to forcefully feed said trash material into said straw chopper.

16. The harvesting machine of claim 15 wherein said upper portion of said straw hood includes a second deflector means for deflecting trash material moving along said normal discharge path past said straw chopper into a windrow narrower than the width of said straw hood.

17. The harvesting machine of claim 16 wherein said straw chopper is operable to discharge trash material deflected thereto along a second discharge path.

18. The harvesting machine of claim 17 wherein chopped crop material moving along said second discharge path does not engage said upper portion of said straw hood.

19. The harvesting machine of claim 18 wherein a third deflector means is provided along said second discharge path to disperse trash material discharge from said straw chopper into a path wider than said windrow.

20. The harvesting mechanism of claim 19 wherein said first deflector means includes a deflector plate pivotally connected to straw chopper for movement into said first and second positions.

21. The harvesting machine of claim 20 wherein said separator mechanism has two spaced apart discharge outlets, said harvesting machine having a straw chopper and first deflector means associated with each said discharge outlet.

* * * * *